L. IVERSEN.
AIR VALVE.
APPLICATION FILED MAY 5, 1910.

982,680.

Patented Jan. 24, 1911.

WITNESSES
R. H. Balderson
Walter Tamarisy

INVENTOR
Lorenz Iversen,
by Bakewell, Byrnes & Parmelee,
his Attys.

UNITED STATES PATENT OFFICE.

LORENZ IVERSEN, OF WEST HOMESTEAD, PENNSYLVANIA, ASSIGNOR TO MESTA MACHINE COMPANY, OF PITTSBURG, PENNSYLVANIA, A CORPORATION OF PENNSYLVANIA.

AIR-VALVE.

982,680.  Specification of Letters Patent.  Patented Jan. 24, 1911.

Application filed May 5, 1910. Serial No. 559,548.

*To all whom it may concern:*

Be it known that I, LORENZ IVERSEN, resident of West Homestead, Allegheny county, Pennsylvania, have invented a new and useful Improvement in Air-Valves, of which the following is a full, clear, and exact description, reference being had to the accompanying drawings, forming part of this specification, in which—

Figure 1:
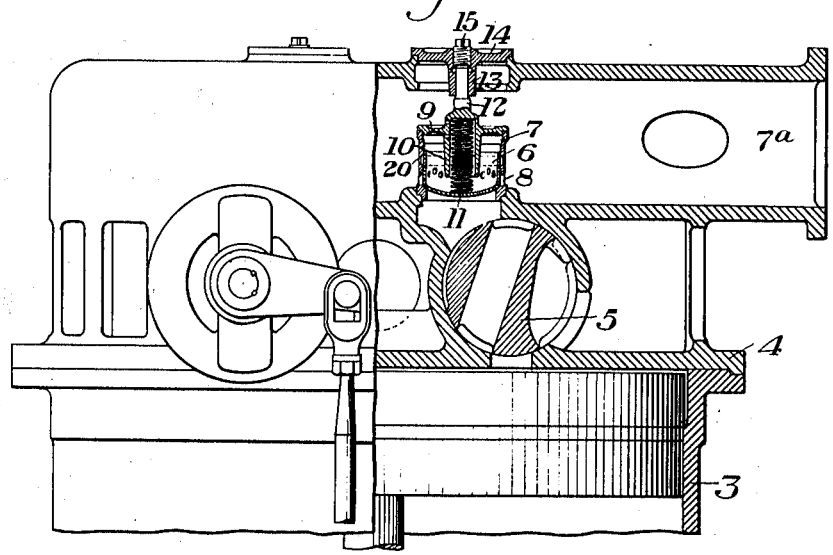
Figure 2:
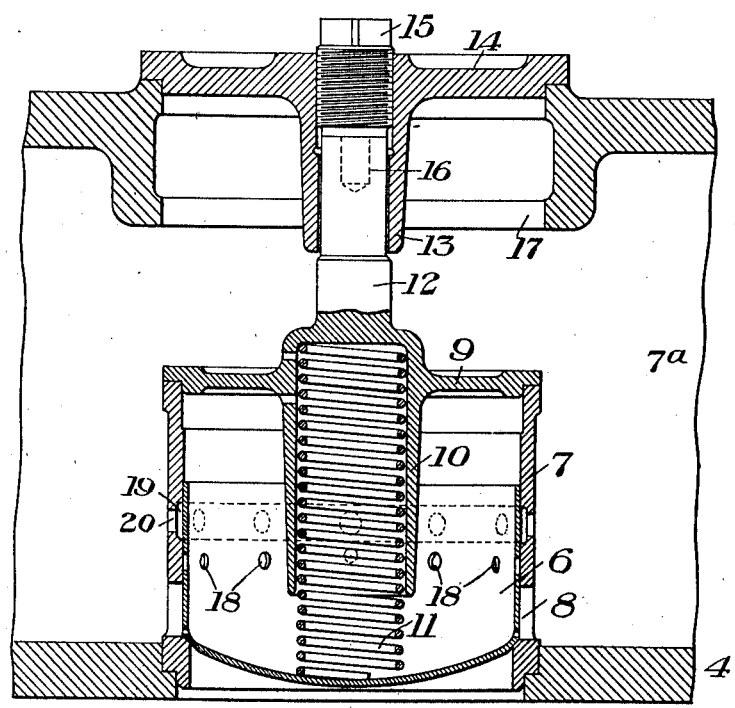

Figure 1 is a view partly in side elevation, and partly in section, of a portion of an air compressor or blowing engine and illustrating the use of a valve embodying my invention; and Fig. 2 is an enlarged vertical section showing the preferred form of my improved valve.

My invention has relation to air valves for blowing engines, or compressors, and is designed to provide a valve having as few parts as possible and in which the danger of any part becoming deranged or failing to operate properly is eliminated.

A further object of the invention is, to provide means for cushioning the movements of the valve.

The invention is of particular advantage in connection with a blowing engine or compressor of the type described and claimed in the patent to George Mesta, No. 958,705 dated May 17, 1910, in which a positively actuated cut-off valve is employed intermediate the cylinder and the discharge valve, whereby the discharge valve may be given a slow closing movement, since the cut-off is effected by the positively actuated valve.

Fig. 1 of the accompanying drawing shows my invention applied to a blowing engine or compressor of this type, 3 being the tub or cylinder, 4 one of the heads having a rotary positively actuated cut-off valve 5 at each side of the piston center, and 6 being one of my improved air valves of the puppet type, and which is seated between the positively actuated valve 5 and the discharge 7. The valve 5, together with means for actuating the same is more fully described in the said patent, to which reference may be made.

The discharge valve 6 is of cup form, and is seated within the cage 7 having the lateral discharge ports 8 near its lower end, and which communicate with the discharge passage or receiver space 7ª. The cage 7 is shown as provided with a separate top plate 9 having a depending hollow sleeve portion 10 extending centrally within the cage and forming a seat for a spiral spring 11, which bears at its lower end against the bottom of the valve. The cover 9 also has an upwardly projecting stem 12, which is guided in a depending sleeve or hub 13 of a removable cap plate 14 secured to the cylinder head. The upper end of the stem 12 is engaged by a removable screw plug 15, and the end of the stem has therein a suitable socket 16 which can be engaged by a lifting device when the plug 15 is removed. By the removal of this plug and of the cap plate 14, the entire cage can be lifted vertically through the opening 17 in the outer end wall of the cylinder head.

The valve 6 is formed with a plurality of air holes 18 arranged around its circumference, and the cage 7 has an internal circumferential groove 19 which communicates with the outside of the cage by the series of holes 20. In the closed position of the valve 6 the holes 18 are a short distance below the lower edge of the groove 19. When the valve starts to open, it first compresses the air within the cage; but after a short vertical movement the first holes 18 of the series of these holes come in line with the groove 20, which permits the partially compressed air within the cage to escape through the perforations 20, this escape becoming more free as more of the holes are brought into line with this groove. When all of the holes 18 have passed above the upper edge of the groove, the air is again confined within the cage, resulting in a compression which cushions the valve at the end portion of its upstroke. The spring acts to close the valve, the closing movement being comparatively rapid until the perforations 18 pass the groove 19. No further air can then be admitted to the cage from the outside, and a partial vacuum is formed within the cage which retards the final closing movement of the valve and cushions its seating. In this manner the pounding of the valve and hammering and cutting thereof, and of the valve seat, is prevented. The spring 11 can be made very light, all that is required being that it shall be sufficiently strong to overcome the friction between the valve and cage. The valve itself can be made very light, since it can be made from a single piece of relatively thin metal, the cylindrical portion being machined to fit accurately within the cage.

The advantages of my invention will be apparent to those skilled in the art, since it provides a valve which is extremely simple in its construction and arrangement; in which there are no parts to become deranged in operation; which can be manufactured at a low cost; and in which hammering of the valve is prevented.

I do not limit myself to the precise construction and arrangement of the parts which I have herein shown and described, since the valve cage may be constructed and arranged in various ways; the exact form of the valve may be changed; and other minor changes may be made without departing from the spirit and scope of my invention as defined in the claims.

What I claim is:—

1. In a valve of the character described, a cage having openings in its lateral walls, and a valve member seated within the cage and having lateral perforations which are arranged to communicate with the openings in the cage at an intermediate point in the stroke of the valve; substantially as described.

2. In a valve of the character described, a cage having openings in its lateral walls, a valve member seated within the cage and having lateral perforations which are arranged to communicate with the openings in the cage at an intermediate point in the stroke of the valve, said perforations being below the openings of the cage when the valve is closed and above said openings when the valve is fully opened; substantially as described.

3. In a valve of the character described, a cage having openings in its lateral walls, a valve member seated within the cage and having lateral perforations which are arranged to communicate with the openings in the cage at an intermediate point in the stroke of the valve, together with a spring acting to close the valve; substantially as described.

4. In a valve of the character described, a cage having openings in its lateral walls, a valve member seated within the cage and having lateral perforations which are arranged to communicate with the openings in the cage at an intermediate point in the stroke of the valve, the said perforations being located at different points so as to come into register with said openings at different times; substantially as described.

5. In a valve of the character described, the combination with a cage having an internal circumferential groove with openings leading outwardly therefrom, of a valve member of cup form seated within said cage and having a plurality of staggered perforations in its lateral walls, said perforations being arranged to come into register with said groove during the intermediate portion only of the valve travel; substantially as described.

6. In a valve of the character described, a cage having an air opening in its lateral wall, and a valve member seated within the cage and having lateral openings which are arranged to communicate with the opening in the cage at an intermediate point in the stroke of the valve; substantially as described.

In testimony whereof, I have hereunto set my hand.

LORENZ IVERSEN.

Witnesses:
    FR. OTTESEN,
    F. J. WALDSCHUTZ.